Aug. 13, 1940.   D. H. STEWART   2,211,356
SHUTTER OPERATING MECHANISM
Filed Sept. 8, 1938
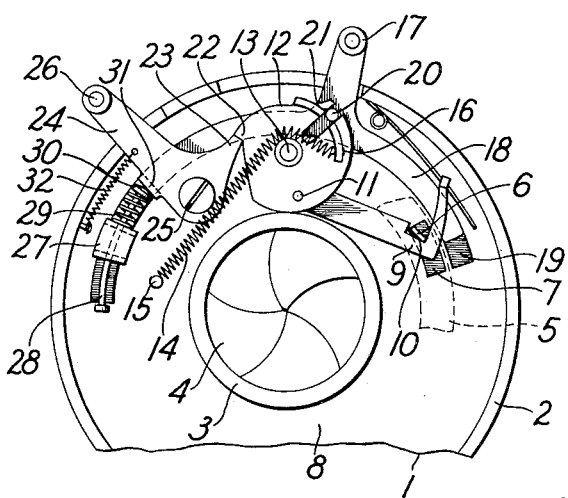
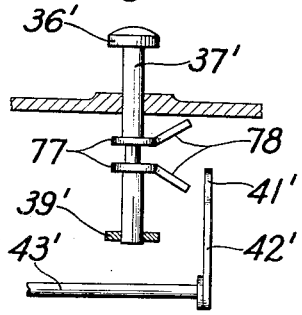
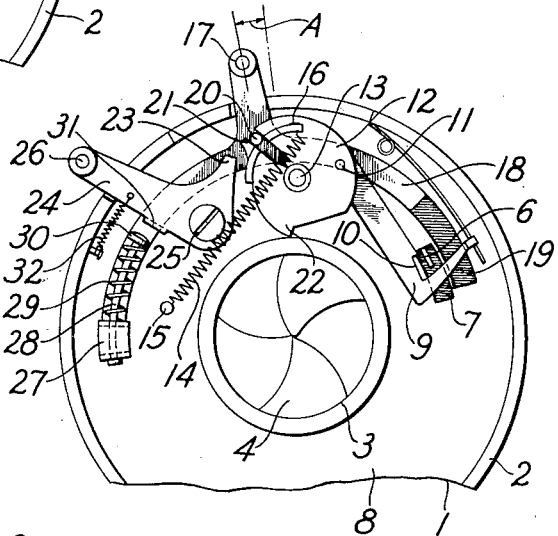
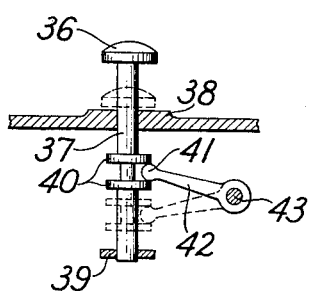
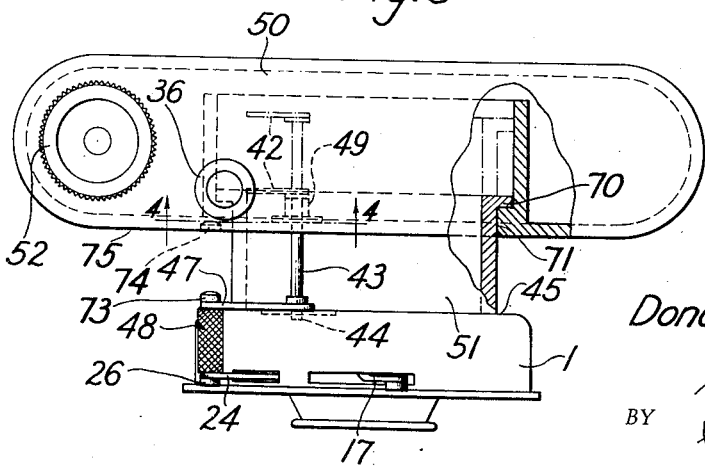
Donald H. Stewart
INVENTOR Patented Aug. 13, 1940

2,211,356

UNITED STATES PATENT OFFICE 2,211,356

SHUTTER OPERATING MECHANISM

Donald H. Stewart, Rochester, N. Y., assignor to Eastman Kodak Company, Rochester, N. Y., a corporation of New Jersey Application September 8, 1938, Serial No. 228,978

6 Claims. (Cl. 95—63)

This invention relates to photography, and particularly to photographic cameras in which a trigger mounted on the camera shutter is connected to a shutter actuator mounted on the camera body.

One object of my invention is to provide a simple connection between a camera body and camera shutter by which a trigger and an operating member may be connected to work in unison. Another object of my invention is to provide a single rotatably mounted shaft for connecting the shutter trigger and camera body release to enable satisfactory light-tight joints between the camera and the shaft to be made. Another object is to provide a shutter trigger with a substantial operating portion which is conveniently arranged about an edge of the shutter casing and which forms a convenient means for connecting the trigger with a release on the camera body. Still another object of my invention is to provide a camera with a telescoping connecting member which will permit the camera to fold, and other objects will appear from the following specification, the novel features being particularly pointed out in the claims at the end thereof.

This application is a continuation-in-part of my copending application Serial No. 202,493, filed April 16, 1938.

In cameras in which the shutter release is carried by the camera body, it is sometimes difficult to provide a suitable connection between the body release and the trigger on the camera. This is particularly true in the so-called miniature type of cameras wherein space is extremely limited. It is also desirable to provide a means for holding the shutter trigger against operation until the camera parts have been positioned for taking exposures.

In cameras of the type described, it frequently happens that double exposure prevention mechanism is used, and it is therefore desirable to have a shutter operating lever connected to the camera body in such a way that the portion of the connection carried by the body is available for use with the double exposure prevention structure. The shutter release described herein has been particularly designed for a camera of this type.

Coming now to the drawing, wherein like reference characters denote like parts throughout:

Fig. 1 is a plan view of the essential parts of a shutter constructed in accordance with and embodying a preferred form of my invention, the parts being shown in position for exposure and the shutter cover being removed.

Fig. 2 is a view similar to Fig. 1, but with the parts in an inoperative position.

Fig. 3 is a top plan view of my preferred form of shutter mounted on a simple type of camera.

Fig. 4 is a section on line 4—4 of Fig. 3, and

Fig. 5 is a fragmentary part section and part elevation taken axially of the objective and showing a preferred form of shutter actuating mechanism for a folding type of camera.

As indicated in Fig. 1, the shutter may comprise a casing 1 having an upstanding flange 2 and a central opening 3 through which light rays pass in making an exposure. The shutter leaves 4 may be of a known type which may be moved back and forth to open and close the aperture 3 by means of a blade ring 5 including an upstanding lug 6 projecting through the slot 7 in the shutter plate 8.

As thus far described, the mechanism is of a known type.

The lug 6 may be oscillated by means of a latch 9 having a hook 10 for engaging the lug 6 and being pivotally attached at 11 to the master member 12, which is, in turn, pivoted at 13 to the shutter plate 8. The master member is normally turned in a counter-clockwise direction by means of the spring 14 anchored at 15 to the shutter plate 8 and at 16 to the master member. In order to tension the master member and to turn it from its inoperative position, as shown in Fig. 2, to its operative position, shown in Fig. 1, there is a setting lever 17 carried by an arcuate plate 18 mounted to slide in the slot 19.

The lever 17 carries a pin 20 slidably mounted in the groove 21 of the master member so that when the lever 17 is moved from the position shown in Fig. 2 to that shown in Fig. 1, a latch element 22 on the master member is engaged by a latch element 23 of a trigger member 24 pivoted at 25 to the shutter plate 8 and having an operating handle 26. Thus, when the parts are in the position shown in Fig. 1, the latch elements 22 and 23 are engaged because one end 27 of the arcuate member 18 is provided with a pair of spaced bearings through which a curved pin 28 passes, this curved pin supporting a spring 29 which may be placed under tension as soon as the head 30 engages the downwardly extending lug 31 of the trigger, this being caused by moving the handle 17 of the setting lever in a clockwise direction. As soon as the spring 29 reaches sufficient tension to overcome the spring 32, the trigger is moved from its inoperative position in Fig. 2 to a position in which the latch element 23 will be adapted to catch the latch element 22 when the master member has been fully tensioned. It requires only a small portion of the normal movement of lever 17 to place the spring 29 under tension. As this spring is much heavier than spring 32, it immediately overcomes the tension of this light spring and moves the trigger 26 to its operative position.

There are a number of advantages in having this construction: Should the operator attempt to make an exposure, by pressing down the trigger 26 or by pressing down the camera body release 36 which will be hereinafter more fully described, he will immediately find that the trigger cannot be depressed, if the shutter is not in condition for exposure. In other words, since the trigger is at its limit of downward movement when the setting lever is in the position shown in Fig. 2, it cannot be further moved. This will, therefore, call to the attention of the operator the necessity of conditioning the shutter for exposure by moving the setting lever 17 in a clockwise direction until the master member has been set and the trigger has been operatively positioned.

The body release 36 may consist, as indicated in Figs. 3 and 4, of a push-button carried by a plunger 37 mounted in bearings 38 and 39 carried by the camera body. A pair of disk-like members 40 engage both sides of the end 41 of a lever 42 attached to a rotatable shaft 43 which connects the camera body and the shutter 1. This shaft is likewise carried by a bearing member 44 on the back wall 45 of the shutter, this bearing being preferably arranged coaxially with respect to the pivot 25 of the trigger 26. A lever 47 of the same length as the trigger 26 is provided, and a suitable connecting member 48 is arranged between the lever 47 and the trigger 26. Thus, this member forms a connecting member and may likewise be used as a convenient grip, if the shutter trigger is to be operated from the shutter itself. However, if it is desirable to actuate the shutter from the body release member 36, the shaft 43 transmits motion to the shutter 26.

The particular connection described above is desirable because, since the shaft 43 passes through a bearing 49 in the camera body 50, it is a simple matter to make a light-tight connection and the shaft lying adjacent to the tubular shutter support 51 is not in position to be readily damaged in use.

The camera 50 may include the usual winding key 52 for moving film past the exposure aperture and the particular camera diagrammatically shown in Fig. 3 is preferably of the so-called miniature type utilizing 35 mm. perforated or unperforated film.

The operation of the shutter and camera above described is extremely simple. If the operator desires to take a picture, the setting lever 17 is first moved in a clockwise direction to tension the master member spring 14. When the lever has travelled a very short distance, as indicated by A in Fig. 2, the head 30 of the spring plunger has been brought into contact with the downwardly extending lug 31 of the trigger 26 and continued movement of the setting lever 17 immediately tensions the spring 29, this tension at once overcoming the resistance of the spring 32 and moving the trigger in a clockwise direction. The trigger will, therefore, be resiliently pressed against the periphery of the master member 12, and as soon as the master member reaches the position shown in Fig. 1, the latching arm 23 will snap behind the shoulder 22. This movement of the setting arm not only moves the trigger to its operative position of Fig. 1, but if the shutter is connected up with a shutter body release 36, as indicated in Fig. 3, it will move the release member 36 from the broken line positions in Fig. 4 to the full line positions.

An exposure may now be made by pressing either the body release 36 or the elongated trigger grip 48 of the shutter. When a fresh area of film has been wound by the winding key 52, if the operator should forget to set the shutter, he may again endeavor to depress either the body release 36 or the trigger grip 48. However, the parts will be in the position indicated in Fig. 2 and in broken lines in Fig. 4, in which position no depression of either of these members is possible. Consequently, the operator will immediately set the shutter by moving the setting lever 17 in a clockwise direction to set the master member and position the trigger for the second exposure.

I also contemplate using a rotary shaft type of connection between the shutter trigger 24 and the body release 36 on cameras of the folding type. As indicated in Fig. 3, if desired, the tubular member 51 may include an inner flange member 70, which slides in an annular recess 71 axially of the shutter and the objective. With such a structure, it will be obvious that the shaft 43 may slide freely through the bearing 49 in an axial direction, and as soon as the lever 42 is moved with the sliding movement of the tubular member 51, it moves from beneath the flanges 77 on the shutter release 36', as shown in Fig. 5. Consequently, the trigger can no longer be actuated by this member.

The shutter release 36' in this modified form is carried, as before, by a shaft 37', the lower end of which is journaled in a bearing 39'. However, the flanges which engage the operative end 41' of the lever 42', which is keyed to the shaft 43', are somewhat different from those shown in Fig. 4, the reason being that they are provided with offset arm portions 78 which converge toward the shaft 37'.

The reason for this is that usually the trigger 26 will be in the position shown in Fig. 2, but it may be moved from this position by setting the shutter and then closing the camera without making an exposure. Where this is done, it is necessary to guide the end 41 into an operative position between the flanges 77 and consequently, the converging arms 78 are used for a different purpose. The angle of the arms is such that they will properly position the operating member 41' whether or not the shutter is in a set or an unset position.

What I claim is:

1. In a photographic camera including a shutter, the combination with a camera body having walls, of a shutter support carried thereby, a shutter casing mounted on the support, a shutter release on the camera body, a pivoted trigger on the shutter, a shaft extending between the shutter and camera, a lever mounted on the shaft at the back of the shutter and coaxially with the pivoted trigger, and connections between the lever and trigger for moving the latter from the former, and means inside of the camera body for operating the shaft from the shutter release on the camera body when said shutter release is manually operated.

2. In a photographic camera including a shutter, the combination with a camera body having walls, of a shutter support carried thereby, a shutter casing mounted on the support, a movable shutter release on the camera body and having a path of movement therein, a lever lying in the path of movement of the shutter release, a shaft carrying the lever and passing through a suitable bearing in the camera body, a second lever carried by the shaft adjacent the shutter, a trigger on the shutter connected to the second lever whereby movement of the camera body release may transmit movement from the camera body through the shaft to the trigger when the camera body release is manually operated.

3. In a shutter operating means for cameras, the combination with a camera body having walls, of a shutter support slidably carried thereby, a shutter casing carried by the support, a trigger carried by the shutter casing, a shutter release carried by the camera body, connections between the shutter trigger and camera body release including a single shaft, a bearing for one end of the shaft near the shutter trigger, a bearing for said shaft carried by the camera body and extending through a wall thereof, said shaft being mounted to slide and turn in said last-mentioned bearing, sliding therethrough when said shutter support is slid relatively to the camera body.

4. In a shutter operating means for cameras, the combination with a camera body having walls, of a shutter support slidably carried thereby, a shutter casing carried by the shutter casing, a shutter release carried by the camera body, connections between the shutter trigger and camera body release including a single shaft, a bearing for one end of the shaft near the shutter trigger, a bearing for said shaft carried by the camera body and extending through a wall thereof, said shaft being mounted to slide and turn in said last-mentioned bearing, sliding therethrough when said shutter support is slid relatively to the camera body, a bearing for the shutter release carried by the camera body, and means for connecting the shutter release on the camera body and the shaft.

5. In a shutter operating means for cameras, the combination with a camera body having walls, of a shutter support slidably carried thereby, a shutter casing carried by the support, a trigger carried by the shutter casing, a shutter release carried by the camera body, connections between the shutter trigger and camera body release including a single shaft, a bearing for one end of the shaft near the shutter trigger, a bearing for said shaft carried by the camera body and extending through a wall thereof, said shaft being mounted to slide and turn in said last-mentioned bearing, sliding therethrough when said shutter support is slid relatively to the camera body, a bearing for the shutter release carried by the camera body, and means for connecting the shutter release on the camera body and the shaft comprising a lever carried by the shaft having an end for engaging the release and a guideway carried by the shutter release for guiding the lever end adapted to engage the release into operative engagement therewith.

6. In a shutter operating means for cameras, the combination with a camera body having walls, of a shutter support slidably carried thereby, a shutter casing carried by the support, a trigger carried by the shutter casing, a shutter release carried by the camera body, connections between the shutter trigger and camera body release including a single shaft, a bearing for one end of the shaft near the shutter trigger, a bearing for said shaft carried by the camera body and extending through a wall thereof, said shaft being mounted to slide and turn in said last-mentioned bearing, sliding therethrough when said shutter support is slid relatively to the camera body, a bearing for the shutter release carried by the camera body, and means for connecting the shutter release on the camera body and the shaft comprising a lever carried by the shaft including an operating end, a forked guideway carried by the shutter release, said guideway including a pair of arms converging toward the release, whereby the operative end of the lever may be guided beneath the release and into an operative position with respect thereto by sliding the support from the camera body.

DONALD H. STEWART.